United States Patent [19]

Odawara

[11] Patent Number: 4,504,842
[45] Date of Patent: Mar. 12, 1985

[54] RADIATION-SENSITIVE RECORD DISC

[75] Inventor: Kazuharu Odawara, Yokohama, Japan

[73] Assignee: Tokyo Shibaura Denki Kabushiki Kaisha, Kawasaki, Japan

[21] Appl. No.: 460,584

[22] Filed: Jan. 24, 1983

[30] Foreign Application Priority Data

Jan. 29, 1982 [JP] Japan .................................. 57-12796

[51] Int. Cl.³ ............................................. G01D 15/32
[52] U.S. Cl. .................................. 346/137; 346/76 L; 369/284
[58] Field of Search .............. 346/137, 76 L; 369/283, 369/284

[56] References Cited

U.S. PATENT DOCUMENTS

| 3,930,260 | 12/1975 | Sicking | 346/140 |
| 4,038,663 | 7/1977 | Day | 346/137 X |
| 4,074,282 | 2/1978 | Balas | 346/137 X |
| 4,331,966 | 5/1982 | Moe | 346/137 |

Primary Examiner—Joseph W. Hartary
Attorney, Agent, or Firm—Banner, Birch, McKie & Beckett

[57] ABSTRACT

A radiation-sensitive record disc having a first substrate and a second substrate, coaxially positioned and spaced from the first substrate. The second substrate has an inner vent hole perpendicular to its surface which provides fluid communication between the space and the outer surface to the substrate. A pressure equilibrium housing is coaxially provided on the outer surface of the second substrate in communication with the vent hold. This housing has a recess on its inner surface adjacent the outer surface of the second substrate so as to form a cavity. An expansible membrane is provided in the cavity for receiving, through the vent hole, the internal pressure which exists in the air space. This cavity also contains an outer vent hole, on its outer surface, to provide equilibrium between the pressure within the air space and the surrounding air so as to absorb the change of intended pressure within the air space.

8 Claims, 7 Drawing Figures

RADIATION-SENSITIVE RECORD DISC

BACKGROUND OF THE INVENTION

This invention relates to a radiation-sensitive record disc; e.g., an optical disc or video disc. Recently, radiation-sensitive record discs have been widely used for recording and/or reproducing information due to their desirable operational characteristics. For example, radiation-sensitive record discs have the following advantages:

1. High-density recording is provided.
2. Information can be recorded and reproduced without contact between the recording/reading head and the discs. Thus, the surface of the disc will not be scratched and its recording integrity adversely effected.
3. Random access is provided at high speeds.
4. The recording can be preserved for a long period of time without information loss.
5. The recording system is simple in construction and operation.

Because of these advantages, radiation-sensitive record discs are widely used for information recording-reproducing purposes or solely for reproducing purposes. Radiation-sensitive record discs used solely for reproducing purposes may be used, for example, in home video disc systems, business video disc systems, and auto pulse code modification (PCM) disc systems. On the other hand, radiation-sensitive record discs used for recording-reproducing purposes may be used, for example, in document retrieval files, TV video files (i.e., broadcast systems) and as a memory for general purpose computer systems.

The conventional radiation-sensitive record disc as shown in U.S. Pat. No. 4,074,282, comprises two substrates (FIG. 2) each formed, for example, of a transparent plastic plate. Formed directly on one surface of each substrate is an optical information recording layer consisting of an energy-absorbing layer or a light reflective layer. The two substrates of this construction are disposed to face each other such that each recording layer is positioned therebetween. Each recording layer is bonded to a respective substrate with spacers disposed therebetween so as to provide a space between each recording layer.

The substrates of this conventional system must be formed with a relatively small thickness since the writing/reading beam must pass through the substrate without distortion. That is, the use of a substrate having small thickness prevents beam energfy loss and refraction of light as the beam passes through the substrate. Due to the substrate's thickness and transparency requirements, the material used will lack stiffness. However, the air or gas within the space between the substrates will expand or contract as the surrounding heat or atmospheric pressure changes. As a result, the radiation-sensitive record disc will bend or undulate in accordance with this expansion or contraction. Any bending or undulation will cause defocusing of the reading/writing beam resulting in inaccuracies in processing the information. In extreme cases, the record disc and the optical head will eventually contact each other, thereby preventing any processing of the information.

SUMMARY OF THE INVENTION

It is an object of the invention to overcome the prior art disadvantages mentioned above. The invention provides a simple structure for a radiation-sensitive record disc which will not bend or undulate due to expansion of the surrounding air or changes in atmospheric pressure.

Another object of the invention is to provide a radiation-sensitive record disc wherein data processing may be performed over a long period of time without information loss or recording/reading integrity being adversely effected.

A further object of the invention is to provide a radiation-sensitive record disc having high reliability and permitting accurate information processing.

A still further object of the invention is to provide a radiation-sensitive disc which can be easily assembled despite misalignment between some of its component parts.

The radiation-sensitive record disc according to the present invention comprising a first substrate and a second substrate, coaxially positioned and spaced from the first substrate. A recording layer is formed on the inner surface of the first substrate. The second substrate has an inner vent hole perpendicular to its surface which provides fluid communication between the space and the outer surface to the substrate. A pressure equilibrium housing is coaxially provided on the outer surface of the second substrate in communication with the vent hole. This housing has a recess on its inner surface adjacent the outer surface of the second substrate, so as to form a cavity. An expansible membrane is provided in the cavity for receiving, through the vent hole, the internal pressure which exists in the air space. This cavity also contains an outer vent hole, on its outer surface, to provide equilibrium between the pressure within the air space and the surrounding air. As a result, the cavity absorbs the change internal pressure within the air space.

Therefore, the radiation-sensitive record disc will not bend or undulate despite exposure of the disc to heating of the surrounding air or changes in atmospheric pressure. As a result, the disc will perform data processing over a long period of time without information loss and provide high reliability and accurate information processing.

DETAILED DESCRIPTION OF THE PREFERRED EMBODIMENT

Figure 1:
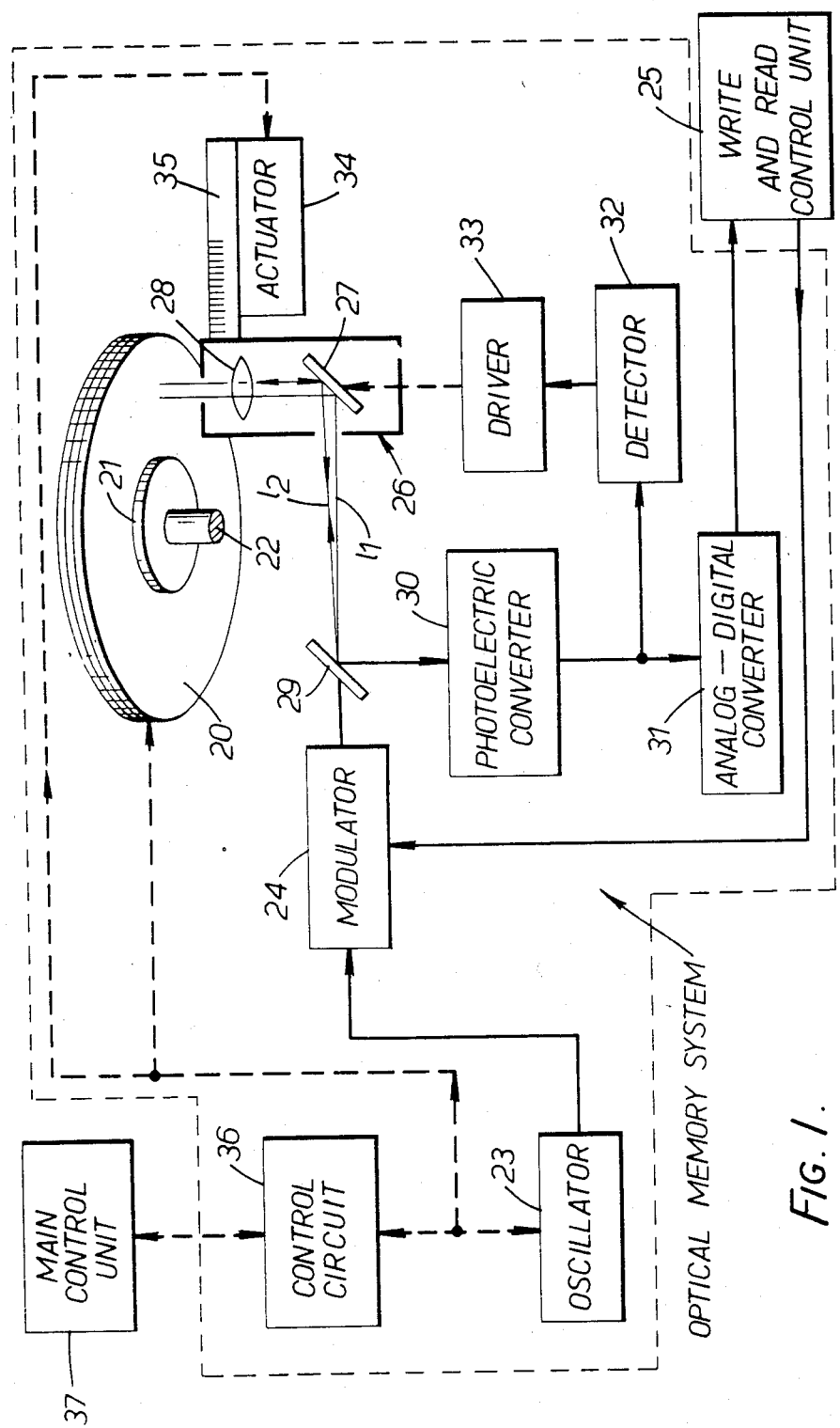
FIG. 1 is a diagram showing a recording and reproducing system utilizing a radiation-sensitive record disc in accordance with the present invention.
Figure 2:
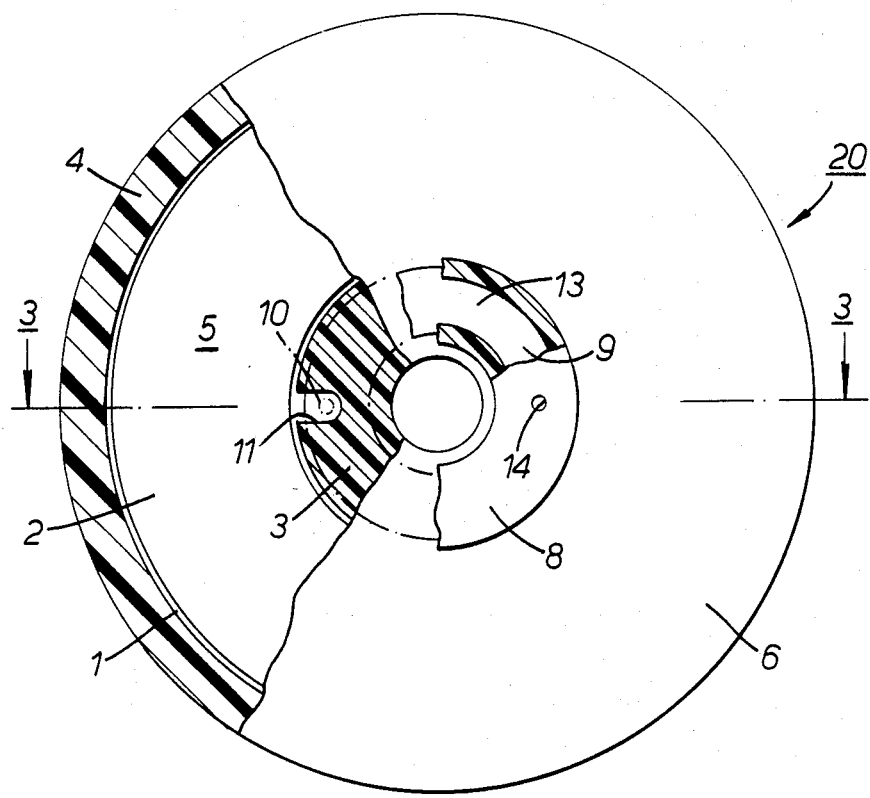
FIG. 2 is a partially cutaway top plan view of the radiation-sensitive record disc shown in FIG. 1.
Figure 3:
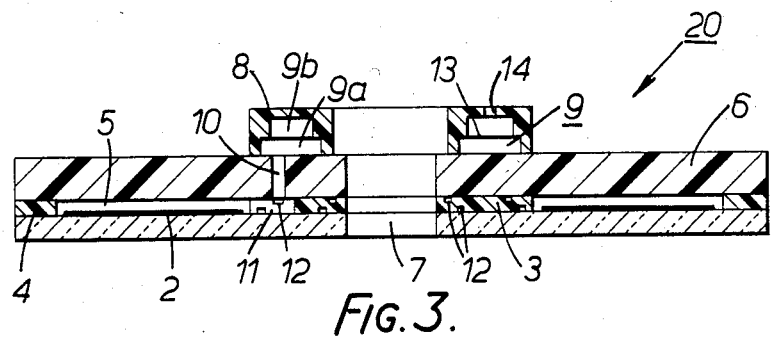
FIG. 3 is a vertical sectional view taken along line 3—3 of the radiation-sensitive record disc shown in FIG. 2.
Figure 4:
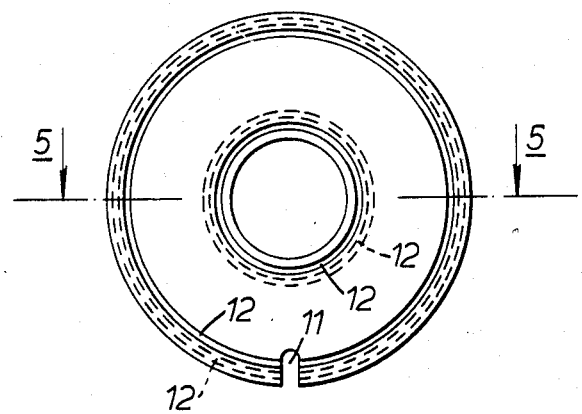
FIG. 4 is a top plan view of the concentric inner spacer used for the radiation-sensitive record disc shown in FIG. 3.
Figure 5:
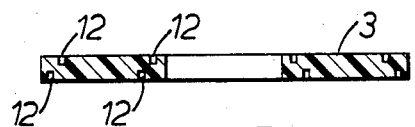
FIG. 5 is a vertical sectional view taken along line 5—5 of the concentric inner spacer shown in FIG. 4.

FIG. 1 is a diagram of a recording and reproducing device which reads and writes information using a radiation-sensitive record disc 20. Record disc 20 is rotated at a constant speed by a disc shaped turntable 21 which is rotated by a driving member (not shown) via drive shaft 22. A laser oscillator 23 produces a laser beam which is modulated by a modulator 24. Modulator 24 is connected to a write and read control unit 25; modulator 24 modulates the laser beam according to the signal output (e.g., video information and index information) from the control unit 25. An optical head 26 receives the modulated laser beam and projects it onto record disc 20 which rotates at a constant speed. Optical head 26 includes a galvanometer 27 which includes a pivotable mirror and a lens system 28 for focusing the beam onto record disc 20. This mirror pivots to a sufficient extent to deflect the beam along the entire radius of record disc 20.

Record disc 20 includes a recording layer which is formed, for example, by depositing a Te layer on the upper surface of a plastic transparent substrate forming an information recording layer. When an incident light beam $l_1$ contacts a portion of the Te layer, that portion is vaporized according to the modulation of the light beam. As a result, a series of reflecting and transparent regions (i.e., information bits) are formed on the record disc according to the modulation. In this way, video information is recorded along a spiral record track on record disc 20.

When reading the information from the record disc, laser beam $l_2$, produced by oscillator 23, scans the record disc which rotates at a constant speed. This light is reflected from disc 20 and is transmitted through optical head 26 and is directed to a reflector 29. Reflector 29 reflects the light onto a photoelectric converter 30, which converts the incident light to electrical analog signals. The signals from converter 30 are supplied to an analog-to-digital converter 31 which converts the analog signals into digital signals suitable for controlling write and read control unit 25. A detector 32 is also connected to photoelectric converter 30 and produces a control signal corresponding to the deviation of laser beam $l_2$ from the center of the information bits stored on the spiral record track. Optimum reproduction performance requires that the reading beam contact the center of each information bit. Consequently, a galvanometer driver 33 is connected to detector 32 for controlling galvanometer 27 according to the control signal from detector 32. In this manner, the light beam is positioned to contact from center of each information bit.

A linear actuator 34 changes the radial position of optical head 26 along record disc 20 according to a control signal from a control circuit 36. Linear actuator 34 is provided with an optical scale 35 for detecting the radial position of optical head 26. Optical scale 35 supplies a position signal to control circuit 36 every time optical head 26 shifts to the next position. Control circuit 36 supplies control signal to a main control unit 37, laser oscillator 23, linear actuator 34 and a drive unit (not shown) for driving record disc 20. Radiation-sensitive record disc 20 is rotated at a constant speed by disc shaped turntable 21 which is rotated by a driving member (not shown) via drive shaft 22. Optical head 26 is positioned below the lower surface of record disc 20 and adjacent its outer edge.

Reference is now made to FIGS. 2-6. A first substrate 1 is made of a transparent acrylic material with a disc-like shape having a diameter, for example, of 300 mm and a thickness of 1-2 mm. A spindle hole 7 is provided in the center of first substrate 1 having a diameter, for example, of 35 mm. A recording layer 2 is formed on one surface of first substrate 1 by vapor-depositing a metal, such as Te, in an annular shape. Spaced coaxially from first substrate 1 is a second substrate 6 with recording layer 2 positioned therebetween. Substrates 1 and 6 are spaced from each other by a concentric inner spacer 3 and a concentric outer spacer 4, thereby providing a space 5 between recording layer 2 and the inner surface of second substrate 6. Spacers 3 and 4 are bonded to substrates 1 and 6 by a suitable bonding agent.

Second substrate 6 has the same outer and inner diameters as first substrate 1; however, second substrate 6 has a larger thickness than substrate 1. As a result, rigidity of the second substrate 6 is greater than the first substrate 1; second substrate 6 thereby forms a reinforcing plate for first substrate 1. Since it is not necessary in the embodiment of FIG. 3 for second substrate 6 to be transparent, it can be made of metal or plastic. Second substrate 6 has a preferred thickness of 1-3 mm for a metal plate construction and approximately 1.5-5 mm for a plastic plate construction.

An annular pressure equilibrium housing 8 is coaxially mounted to the outer surface of second substrate 6 in alignment with inner spacer 3. Equilibrium housing 8 has a recess on its inner surface, adjacent the outer surface of second substrate 6, so as to form a cavity 9. Cavity 9 is designed for fluid communication with space 5 formed between substrates 1 and 6 by way of an inner vent hole 10 passing perpendicularly through second substrate 6. Cavity 9 also contains an outer vent hole 14 to provide equilibrium between the pressure within air space 5 and the surrounding air. As a result, changes in the inner pressure of space 5 will be absorbed, as will be explained in more detail. A notch 11 is provided on the outer circumferential edge of inner spacer 3 so as to provide fluid communication between inner vent hole 10 and air space 5. Spaced annular grooves 12 are concentrically provided on the upper and lower surfaces of inner spacer 3 for preventing leakage of the adhesive agent into air space 5 or spindle hole 7. Inner vent hole 10 is positioned so that it is aligned with one of the groves 12. In this way, fluid communication can be maintained between air space 5 and inner vent hole 10 by way of groove 12 even when inner vent hole 10 is inadvertently displaced, during assembly, from notch 11.

An annular expansible membrane 13 is provided in cavity 9 for dividing the cavity into a first cavity portion $9_a$ and a second portion $9_b$. Cavity portion $9_a$ is in fluid communication with air space 5 by way of inner vent hole 10, and cavity portion $9_b$ is in communication with the atmosphere by way of outer hole 14 passing through the outer surface of housing 8. Expansible membrane 13 is made of synthetic rubber or the like having a thickness of approximately 0.1 mm.

Figure 6:
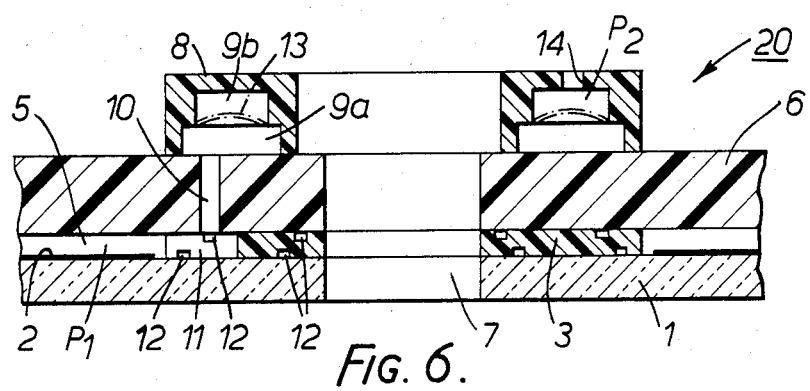
FIG. 6 is an enlarged vertical sectional view of the radiation-sensitive record disc shown in FIG. 2 showing the movement of the expansible membrane.

As shown in FIG. 6, if the inner pressure $P_1$ in air space 5 goes higher than the outside pressure $P_2$, expansible membrane 13 will deform so as to project toward second cavity $9_b$, as shown by the dotted line. On the other hand, if the inner pressure $P_1$ goes lower than the outer pressure $P_2$, expansible membrane 13 will deform so as to project toward first cavity $9_a$. As a result, the volume of cavity $9_a$ will change so that there is no substantial pressure difference between the inner pressure $P_1$ and outer pressure $P_2$; thus, pressure equilibrium between air space 5 and the outside will be maintained.

Expansible membrane 13 cna also prevent the entry of undesirable contaminates such as dust or moisture through cavity 9 which can adversely effect recording layer 2. Further, nitrogen or inert gas, if sealed within air space 5, can be prevented from externally leaking by the use of expansible membrane 13. Further, if the recording layer 2 is exposed to air, it will oxidize and recording/reading will be prevented; membrane 13, however, prevents the passage of air within space 5 while permitting equilibrium to be maintained. Finally, since expansible membrane 13 is contained within housing 8, damages caused to it by manual handling of disc 20 can be prevented.

Figure 7:
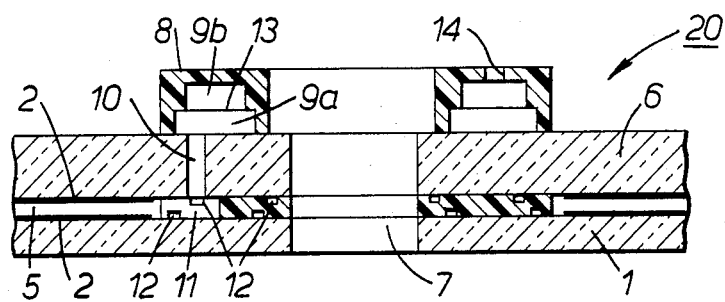
FIG. 7 is an enlarged vertical sectional view of another embodiment of the radiation-sensitive record disc of the instant invention.

This invention is in no way restricted to the above embodiment but may be constructed as shown in FIG. 7. In particular, second substrate can be formed not merely as a reinforcing plate but as a transparent substrate also having a recording layer 2. This structure provides a radiation-sensitive record disc capable of having information processing on both surfaces.

It will be apparent that this invention can be practiced in various embodiments within the scope of this invention.

I claim:

1. A radiation-sensitive record disc, comprising:
   a first substrate having a recording layer formed thereon;
   a second substrate, having an inner and outer surface, coaxially positioned with said first substrate and adjacent said recording layer to form an air space therebetween; and
   a pressure equilibrium means coupled to said air space for equalizing the pressure between said air space and the air surrounding said outer space, wherein said pressure equilibrium means comprises:
   a pressure sensitive expansible means having a first surface coupled to said air space and a second surface coupled to said surrounding air for equalizing the pressure on said first and second surfaces.

2. The radiation-sensitive record disc of claim 1 wherein said pressure equilibrium means further comprises:
   an inner venting means coupled to said air space and said first surface for permitting fluid communication therebetween.

3. The radiation-sensitive record disc of claim 2 wherein said pressure equilibrium means further comprises:
   an outer venting means coupled to said surrounding air and said second surface for permitting fluid communication therebetween.

4. The radiation-sensitive record disc of claim 3 wherein said equilibrium means further comprises:
   a cavity having a first portion and a second portion, said first portion separated from said second portion by said expansible means.

5. The radiation-sensitive record disc of claim 3 further comprising:
   a spacer means for spacing the first and second substrates, said spacer means comprising an annular plate having spaced grooves concentrically provided on its surface to permit fluid communication between said air space and said inner venting means.

6. The radiation-sensitive record disc of claim 5 wherein said spacer means further comprises a notch passing through said plate, adjacent its circumferential edge, for permitting fluid communication between said air space and said inner venting means.

7. The radiation-sensitive record disc as claimed in claim 1 wherein said first substrate comprises a transparent plastic substrate.

8. The radiation-sensitive record disc as claimed in claim 7 wherein said second substrate comprises a transparent plastic substrate having a recording layer formed thereon.

* * * * *